United States Patent Office 2,793,237
Patented May 21, 1957

---

2,793,237

PROCESS FOR THE MANUFACTURE OF DICHLORO-DIPHENYL-DICHLOROETHANE

Everett E. Gilbert, Flushing, and Henry R. Nychka, Bayside, N. Y., assignors to Allied Chemical & Dye Corporation, New York, N. Y., a corporation of New York No Drawing. Application May 29, 1953,
Serial No. 358,522

4 Claims. (Cl. 260—649)

This application relates to a method for preparing 1,1 - bis(4 - chlorophenyl)2,2 - dichloroethane, sometimes called "DDD" or "TDE," and more particularly to a process for preparing it by the dechlorination of 1,1-bis(4-chlorophenyl) 2,2,2-trichloroethane (DDT).

Dichloro-diphenyl-dichloroethane, which is the chemical name approved by the Insecticide Division of the Department of Agriculture for designating 1,1-bis(4-chlorophenyl)-2,2-dichloroethane in the ingredient statements on labels (Soap and Sanitary Chemicals, vol. 29, No. 1, January, 1953, pages 127 and 131), and will be so used herein, has recently become of considerable commercial interest as an insecticide for certain purposes for which it is more effective or otherwise more suitable than is DDT.

Dichloro-diphenyl-dichloroethane has been manufactured in the past by reacting monochlorobenzene with dichloroacetaldehyde or its derivatives such as the acetals or alcoholates, in the presence of oleum or concentrated sulfuric acid in a manner similar to that used in the manufacture of DDT from chloral. In carrying out such processes, it has been found that the resulting dichloro-diphenyl-dichloroethane usually is contaminated with a considerable amount of DDT since the dichloroacetaldehyde is usually contaminated with the trichloro compound.

It is also known (Journal of the Chemical Society, (1946) page 333) that dichloro-diphenyl-dichloroethane may be prepared by subjecting DDT to dechlorination in the presence of zinc dust and hydrochloric acid. This process results in a poor yield of dichloro-diphenyl-dichloroethane (about 40%) together with side reaction products. Moreover this process is uneconomical since zinc is an expensive reducing agent and, according to the process as described, required large quantities of zinc, for example, 75% by weight based on the weight of the DDT treated.

It is an object of the present invention to prepare 1,1-bis(4-chlorophenyl) 2,2-dichloroethane from 1,1-bis (4-chlorophenyl) 2,2,2-trichloroethane, in higher yields and purity than have heretofore been obtained.

It is a further object of the invention to prepare dichloro-diphenyl-dichloroethane from DDT in an economic, inexpensive process.

These and other objects are accomplished according to our invention wherein DDT is dechlorinated and reduced to dichloro-diphenyl-dichloroethane by subjecting DDT to the action of metallic iron and hydrochloric acid in the presence of a lower saturated aliphatic alcohol having from 1 to 3 carbon atoms inclusive.

In carrying out the process of our invention, DDT is charged to a suitable reaction vessel together with the alcohol and iron. The charge is heated, for example under reflux, and the hydrochloric acid is added followed by additional heating and stirring for a period preferably sufficient to permit the reduction of DDT to dichloro-diphenyl-dichloroethane to go to substantial completion.

After completion of the reduction, the alcohol may readily be recovered by distillation from the reaction mixture. The alcohol-free residue may then be extracted with a suitable solvent, preferably water-immiscible, and water added to dissolve ferrous chloride formed in the reaction. The combined layers may then be filtered to remove unreacted iron. The mixture is allowed to stratify into a solvent layer and an aqueous layer which are separated. The solvent layer, containing the desired dichloro-diphenyl-dichloroethane product, may be freed of solvent, as for example, by volatilization, leaving the desired solid dichloro-diphenyl-dichloroethane product as a residue.

The reaction proceeds according to the following equation.

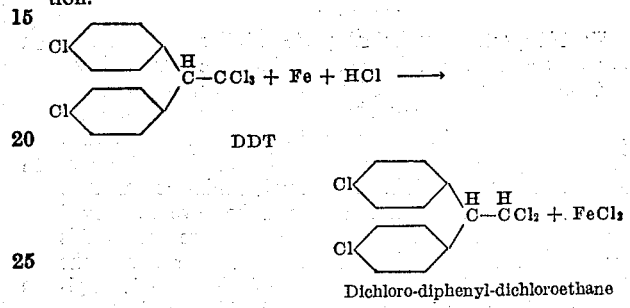

Dichloro-diphenyl-dichloroethane

The alcohol used as the reaction medium may be any saturated aliphatic alcohol having from 1 to 3 carbon atoms inclusive, for example, methanol, ethanol, n-propanol and isopropanol. The quantity of alcohol used is not unduly critical but should be sufficiently large to provide a fluid reaction medium, but as small as possible consistent with good fluidity, since the solvent medium is eventually removed and desirably recovered. Proportions of at least about 4 parts of alcohol to 1 part of DDT by weight are preferably used, although quantities as low as 2.5 parts of alcohol to 1 part DDT may be used in the case of isopropanol.

The quantities of hydrochloric acid should preferably be molecularly equivalent to the quantity of iron. Other mineral acids may be used, but in general are not as satisfactory as hydrochloric acid since they introduce contaminating elements into the mixture which tend to complicate the reaction and the recovery and purification process.

The use of iron in the reaction appears to be critical since other reducing metals such as zinc do not produce the advantageous economic yields which are obtained through the use of iron. The quantity of iron used is not critical but for best results there should be present at least about 1.5 mols (about 24% by weight) of metallic iron per mol of DDT charged. Quantities up to about 50% appear to be satisfactory. Greater quantities, i. e. more than about 50% appear actually to reduce the yield of the desired dichloro-diphenyl-dichloroethane product.

Preferable reaction temperatures are from about 60° C. to about 100° C. The reaction can conveniently be carried out under refluxing of the alcohol to maintain the components of the reaction mixture in contact at the desired temperature.

Time of reaction may vary somewhat, depending on the temperature of reaction, but usually is complete in not more than about 10 hours; usually between about 1.5 hours and about 7 hours being sufficient.

The following specific examples will further illustrate our invention. Parts are by weight except as otherwise noted.

*Example 1*

To 100 parts of pure ("aerosol grade") DDT dissolved in 235.5 parts (500 parts by volume) of isopropanol, were added 24 parts by weight of iron filings. Then, 46 parts by volume of concentrated (35%) hydrochloric acid were added dropwise with heating and agitation over 2 hours, followed by further heating and agitation for 1½ hours to complete the reaction. The mixture was then filtered to remove unreacted iron and was heated to volatilize the isopropanol. The resulting product was then extracted with 450 parts of benzene. The benzene was then evaporated and the dichloro-diphenyl-dichloroethane product was obtained in a yield of 84% as the p,p' isomer. It contained 0.1% of DDT and 5% of a high boiling (200° C.) impurity.

Example 2

The process of Example 1 was repeated using a technical grade of DDT instead of "aerosol grade." The yield of dichloro-diphenyl-dichloroethane, corrected for 0.6% DDT and 3.5% of an unknown impurity was 84%.

Example 3

To 100 parts of technical grade DDT was added 500 parts by volume of 95% ethanol (402 parts by weight) and 24 parts by weight of iron filings. Then, 46 parts by volume of concentrated (35%) hydrochloric acid were added dropwise with heating and agitation over 2 hours, followed by further heating and agitation for 1½ hours to complete the reaction. The reaction mixture was then filtered to remove unreacted iron, and the solvent removed by evaporation. The product was recovered from this residue by extraction with benzene and evaporation of the benzene from the extract. 84% of dichloro-diphenyl-dichloroethane product was obtained. The product contained 0.3% DDT and less than 1% of impurities.

Example 4

To 100 parts of "aerosol grade" DDT, dissolved in 1200 parts by volume of 95% ethanol, were added 200 parts by volume of concentrated hydrochloric acid and 64 parts by weight of iron filings. The mixture was refluxed with stirring for 7 hours, then filtered to remove unreacted iron and heated to remove the ethanol by evaporation. The residue was extracted with benzene and upon evaporation of benzene from the extract, 67 parts by weight of product was obtained of which 52 parts (57% yield) was identified as dichloro-diphenyl-dichloroethane.

In a test identical with that described as above, as recorded in the literature (J. C. S. (1946), pages 337 and 338), except that 75 parts of granulated zinc was used instead of iron filings, a yield of only about 40% of dichloro-diphenyl-dichloroethane was isolated along with appreciable quantities of undesired by-products.

While the examples illustrate application of the process of the invention to technical and aerosol grades of DDT, the invention is obviously applicable to other compositions containing DDT, for example, the crude dichloro-diphenyl-dichloroethane compositions prepared by methods which leave in the product substantial amounts of DDT.

We claim:

1. A process for preparing 1,1-bis(4-chlorophenyl)-2,2-dichloroethane which comprises subjecting 1,1-bis-(4-chlorophenyl) 2,2,2-trichloroethane to the action of metallic iron and concentrated hydrochloric acid in the presence of a reaction medium consisting of a lower saturated aliphatic alcohol having from 1 to 3 carbon atoms inclusive, at temperatures from about 60° C. to about 100° C.

2. A process for preparing 1,1-bis(4-chlorophenyl)-2,2-dichloroethane which comprises subjecting 1,1-bis-(4-chlorophenyl) 2,2,2-trichloroethane to the action of metallic iron and concentrated hydrochloric acid in the presence of a reaction medium consisting of a lower saturated aliphatic alcohol having from 1 to 3 carbon atoms inclusive, at temperatures from about 60° C. to about 100° C. for a period between about 1.5 hours and about 7 hours.

3. The process of claim 1 wherein the alcohol is ethanol.

4. The process of claim 1 wherein the alcohol is isopropanol.

References Cited in the file of this patent

UNITED STATES PATENTS 753,325   Smith _____ Mar. 1, 1904

OTHER REFERENCES

"Jour. Chem. Soc." (1946), page 333.

Fieser: "Experiments in Organic Chemistry," pages 327–8 (1935).